United States Patent
Wikström et al.

(10) Patent No.: US 10,498,493 B2
(45) Date of Patent: Dec. 3, 2019

(54) LTE HARQ FEEDBACK FOR CONFIGURED UPLINK GRANTS

(71) Applicant: TELEFONAKTIEBOLAGET LM ERICSSON (PUBL), Stockholm (SE)

(72) Inventors: Gustav Wikström, Täby (SE); Erik Eriksson, Linköping (SE); Magnus Stattin, Upplands Väsby (SE); Andreas Bergström, Linköping (SE); Niklas Andgart, Södra Sandby (SE); Torsten Dudda, Aachen (DE); Osman Nuri Can Yilmaz, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/762,648

(22) PCT Filed: Sep. 26, 2016

(86) PCT No.: PCT/IB2016/055754
§ 371 (c)(1),
(2) Date: Mar. 23, 2018

(87) PCT Pub. No.: WO2017/051397
PCT Pub. Date: Mar. 30, 2017

(65) Prior Publication Data
US 2018/0270020 A1 Sep. 20, 2018

Related U.S. Application Data

(60) Provisional application No. 62/232,126, filed on Sep. 24, 2015.

(51) Int. Cl.
*H04L 1/08* (2006.01)
*H04W 72/14* (2009.01)
(Continued)

(52) U.S. Cl.
CPC .............. *H04L 1/08* (2013.01); *H04L 1/1607* (2013.01); *H04L 1/1816* (2013.01);
(Continued)

(58) Field of Classification Search
None
See application file for complete search history.

(56) References Cited

U.S. PATENT DOCUMENTS

2008/0242236 A1* 10/2008 Spencer ............... H04L 1/1614
455/73
2009/0221289 A1* 9/2009 Xu ....................... H04L 1/0023
455/435.1
(Continued)

FOREIGN PATENT DOCUMENTS

EP     2244403 A1   10/2010
WO  2008132599 A2   11/2008
WO  2013176695 A1   11/2013

*Primary Examiner* — Hong S Cho (57) ABSTRACT

A method for retransmission of uplink transmissions, performed by a wireless device with configured uplink grants. The method comprises transmitting a first transmission to a network node with a redundancy version (RV). The wireless device then determines to retransmit the first transmission, and retransmits the first transmission with a retransmission RV based on the type of retransmission. For a non-adaptive retransmission, the retransmission RV value is the same as the RV of the first retransmission. For an adaptive retransmission, the retransmission RV is the RV value received in a retransmission grant.

14 Claims, 6 Drawing Sheets

(51) Int. Cl.
*H04L 1/18* (2006.01)
*H04L 1/16* (2006.01)
*H04W 72/12* (2009.01)

(52) U.S. Cl.
CPC ....... *H04L 1/1819* (2013.01); *H04W 72/1268* (2013.01); *H04W 72/14* (2013.01)

(56) References Cited

U.S. PATENT DOCUMENTS

2014/0029557 A1\* 1/2014 Jongren ................ H04L 1/1854
370/329
2014/0362747 A1\* 12/2014 Yang .................... H04L 1/1861
370/280

\* cited by examiner

LTE HARQ FEEDBACK FOR CONFIGURED UPLINK GRANTS

This application is a 371 of International Application No. PCT/162016/055754, filed Sep. 26, 2016, which claims the benefit of U.S. Application No. 62/232,126, filed Sep. 24, 2015, the disclosures of which are fully incorporated herein by reference.

TECHNICAL FIELD

Certain embodiments relate, in general, to wireless communications and, more particularly, to hybrid automatic repeat request (HARQ) retransmissions for configured uplink grants.

BACKGROUND

In LTE Release 13, a study item on latency reduction is under progress. One of the proposed concepts, "Fast Uplink (UL)", is an enhancement of semi-persistent scheduling (SPS) in which a recurring grant is configured for a user equipment (UE) with a period down to 1 (one) transmission time interval (TTI). If configured for Fast UL, when the UE does not have data to transmit it does not have to send padding messages in the periodic grant. Configuring a Fast UL grant for the UE allows the UE to use the granted resource immediately when it has data without having to send a scheduling request (SR) message. This can provide considerable latency gains.

Figure 1:
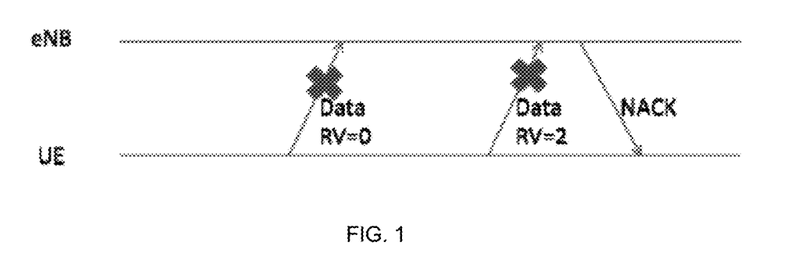
FIG. 1 illustrates a Fast UL communication.

FIG. 1 depicts a scenario in which a transmission from an UE configured with a Fast UL grant is not received by an enhanced nodeB (eNB). In this example, since the eNB does not know beforehand in which grant the UE will transmit data, and since no padding messages are sent when the grant is not used, there is a risk that the eNB will simply miss an initial transmission, and consequently, the eNB will not send HARQ feedback, e.g. an acknowledgement (ACK) or a negative acknowledgement (NACK). In this case, the UE may interpret no feedback as NACK and retransmit with an increased redundancy version (RV), as depicted in FIG. 1, causing an RV mismatch between the RV value the eNB is expecting to receive and the one actually sent by the UE. In another example (not shown), when the eNB does not send feedback, the UE, which is listening to physical HARQ indicator channel (PHICH), may nevertheless falsely detect an ACK and determine that the transmission was received by the eNB. This scenario will cause a loss of data, at least until RLC retransmission.

Figure 2:
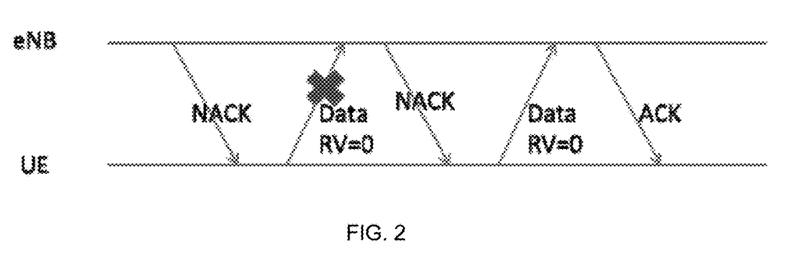
FIG. 2 illustrates another Fast UL communication.

FIG. 2 depicts an example of another scenario that results in an RV mismatch. In this example, the eNB misses the transmission from the UE and sends a NACK to the UE. The UE receives the NACK indicating that the eNB did not correctly receive the transmission, and decides to perform retransmission. For the retransmission, the UE will increase the redundancy version (RV) from RV=0 to RV=2, to track the number of retransmissions. However, because the eNB missed the first transmission, it will continue to expect to receive RV=0. Again, this creates an RV mismatch scenario between the eNB and the UE.

While Fast UL reduces the latency for uplink transmissions, it may also be desirable to improve reliability for some applications such as vehicle-to-everything (V2X) and other critical machine-type communication (MTC) use cases in which higher reliability, along with lower latency, is targeted. Hence, both the feedback misinterpretation and the resulting RV mismatch between the UE and the eNB could be a more important problem for the low-latency services.

SUMMARY

Disclosed herein is a set of improvements to the existing LTE standard for configure UL grants (also referred to as "continuous uplink grants") to address feedback misinterpretation and the RV mismatch, described above. Certain embodiments disclosed herein may have the further advantage of avoiding or reducing decoding errors in eNB due to a mismatch of RV values. Some embodiments may have the further advantage of avoiding or reducing data loss due to false detection of ACK from eNB.

According to a first aspect, the object is achieved by a method for retransmission of uplink transmissions, performed by a wireless device with configured uplink grants. The method comprises, transmitting a first transmission to a network node with a redundancy version (RV). The wireless device then determines to retransmit the first transmission, and retransmits the first transmission with a retransmission RV based on the type of retransmission. In a second embodiment of the first aspect, the retransmission is non-adaptive, and the retransmission RV is the same as the RV of the first transmission. In a third embodiment of the first aspect, determining to retransmit the first transmission comprises receiving a negative acknowledgment (NACK) from the network node in response to the first transmission. In a fourth embodiment of the first aspect, determining to retransmit the first transmission comprises detecting discontinuous transmission (DTX) from the network node in response to the first transmission. In a fifth embodiment of the first aspect, determining to retransmit the first transmission comprises receiving an acknowledgment grant with an RV value specified by the network node, and the retransmission is adaptive. In a sixth embodiment of the first aspect, the method further comprises retransmitting with the same RV of the first transmission until detecting that the retransmission was successfully decoded by the network node.

According to a second aspect, the object is achieved by a wireless device for performing retransmission of uplink transmissions of based on configured grants. The wireless device comprises power supply circuitry configured to supply power to the wireless device. The wireless device also comprises processing circuitry configured to transmit a first transmission to a network node with a redundancy version (RV) and determine whether to retransmit the first transmission. The processing circuitry further, based on the determination, retransmits the first transmission with a retransmission RV based on the type of retransmission.

According to a third aspect, the object is achieved by a user equipment (UE) for performing retransmission of uplink transmissions based on configured grants. The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to transmit a first transmission to a network node with a redundancy version (RV), determine whether to retransmit the first transmission, and based on the determination, transmit the first transmission with a retransmission RV based on the type of retransmission. The UE also comprises an input interface connected to the processing circuitry and configured to allow input of information into the UE to be processed by the processing circuitry, an output interface connected to the processing circuitry and configured to output information from the UE that has been processed by the processing circuitry, and a battery connected to the processing circuitry and configured to supply power to the UE.

According to a fourth aspect, the object is achieved by a wireless device for performing retransmission of uplink transmissions based on configured grants. The wireless device comprises processing circuitry configured to transmit a first transmission to a network node with a redundancy version (RV), determine whether to retransmit the first transmission, and based on the determination, transmit the first transmission with a retransmission RV based on the type of retransmission. The wireless device further comprises power supply circuitry configured to supply power to said wireless device.

According to a fifth aspect, the object is achieved by an apparatus for retransmitting uplink transmissions based on configured grants. The apparatus comprises a transmission module configured to transmit a first transmission to a network node with a redundancy version (RV), a determination module configured to retransmit the first transmission, and a retransmission module configured to retransmit the first transmission with a retransmission RV based on the type of retransmission.

According to a sixth aspect, the object is achieved by a wireless device. The wireless device comprises a processor and a memory. The memory contains instructions executable by the processor, which when executed by the processor cause the wireless device to perform the method according to any of embodiments of the first aspect.

According to a seventh aspect, the object is achieved by an apparatus adapted to transmit a first transmission to a network node with a redundancy version (RV), determine whether to retransmit the first transmission, and based on the determination, transmit the first transmission with a retransmission RV based on the type of retransmission.

According to an eighth aspect, the object is achieved by a non-transitory computer readable medium, having stored thereon instructions which when executed by a processor of a wireless device, cause the wireless device to perform the method of any of the embodiments of the first aspect.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

DETAILED DESCRIPTION

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to help convey the scope of the inventive concept to those skilled in the art. If used, like numbers refer to like elements throughout the description.

Certain embodiments of the present disclosure may provide improvements in Fast UL transmissions to address the problems of, e.g. feedback misinterpretation and errors resulting from a mismatch between an RV value of a first transmission and an RV value of a second transmission (or retransmission), as described above for FIGS. 1 and 2. For example, proposed solutions to the above-stated problems may include the following scenarios:

1) When using non-adaptive retransmission and the eNB is configured to send NACK for every UL grant until transmission from the UE has been decoded, the UE does not increase the RV value when retransmitting. In an alternative embodiment, the UE may increase the RV value, and the eNB tests all RV hypothesis for a transmission.
2) When using non-adaptive retransmission and the eNB sends ACK/NACK only for detected UL data, the UE reads ACK/NACK/DTX on PHICH. If the UE reads DTX, the UE does not increase the RV value when retransmitting, e.g. the UE retransmits with RV=0.
3) When using adaptive retransmission, the eNB sends an acknowledgement grant in the form of an empty grant or a new UL data grant as acknowledgement of the UL transmission.

These solutions are described in further detail below.

In embodiment 1) described above, the retransmission is a non-adaptive retransmission and the eNB is configured to continuously send NACK over PHICH for the Fast UL grant (or other continuous grants) until it has correctly decoded a transmission. For example, if the UE sends a transmission and the eNB misses the transmission completely, i.e. it does not detect the transmission, the eNB will still send NACK. On receipt of the NACK, the UE may perform a retransmission in the next grant occasion.

In one embodiment, a UE transmits a first transmission with an RV value, e.g. RV=0. As depicted in FIG. 2, also described above, when the UE is using Fast UL with a configured grant, the eNB may not be sure when the UE will be transmitting and in some cases, may fail to detect the transmission or otherwise, may not be able to receive or decode the transmission correctly. If the eNB does not successfully receive the transmission, the eNB transmits a NACK to the UE. In some cases, the eNB may have repeated difficulty in receiving a transmission successfully, in which case, the eNB may send a NACK for each unsuccessful reception. However, the UE may be unable to tell from the NACK that the eNB missed the transmission and thus, never received the first transmission. Further, an eNB may continue to send NACKs for a transmission until the eNB does not receive a transmission correctly, which can cause even further RV mismatch problems.

Figure 3:
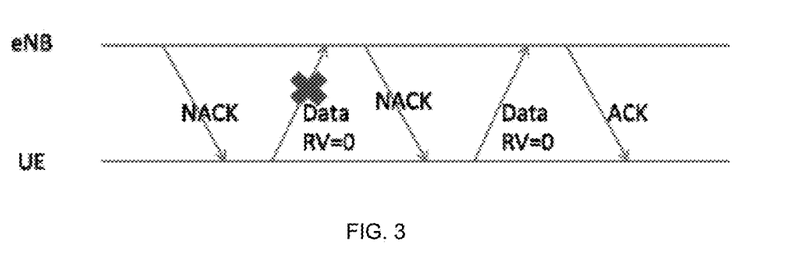
FIG. 3 illustrates a non-adaptive retransmission according to certain embodiments of the disclosure.

FIG. 3 illustrates a proposed solution for non-adaptive retransmissions according to 1) above. To avoid RV mismatch, the UE does not increase RV when attempting retransmissions. For each retransmission, the UE retransmits the transmission with the same RV as the original transmission, e.g. if the first transmission was transmitted with RV=0, then the retransmission will be transmitted with RV=0. Thus, the UE treats all NACKs the same and does not need knowledge of the reason for the NACK. For example, the UE does not need to consider whether the eNB did not receive the transmission, at all, or conversely, received the transmission but did not receive or could not decode it correctly. Because the UE keeps the RV value the same for retransmissions, RV mismatches are avoided between the UE's RV value for retransmission and the RV value expected by the eNB.

In one embodiment, the UE may retransmit the same coded data enabling soft combining in the eNB from the first reception. In other embodiments, the UE may rebuild the transport block for each retransmission, and adds new control elements where needed.

In alternative embodiments the RV may be updated if a NACK is received. In one alternative embodiment, the restriction from increasing the RV for retransmissions may be dependent on the effective code-rate of the uplink transmission. For example, if the effective code-rate is below a configured or standardized threshold, the RV is not updated, while if the code-rate is above a threshold, the RV may be updated for retransmissions. In some embodiments the number of RVs to change between may also be dependent on the code-rate, for example, fewer different RV values, e.g. only RV=0 and 2, are used with low code-rates while all possible RV values are used for higher code-rates. In embodiments where an RV is updated after a NACK is received and there is a possibility of mismatch, the eNB may take additional steps to try to resolve a mismatch, or otherwise determine what RV value may be expected in the retransmission. For example, having more RVs enforces the eNB to blindly try separate hypotheses, and based on capability and need, the eNB may configure the code-rate threshold or set a corresponding transport block size to select between one or multiple RVs.

In other alternative embodiments, the RV is determined based on timing of the radio interface such as e.g. the System Frame Number (SFN). Given the RV sequence {0, 2, 3, 1}, the RV to use for a transmission during subframe SFN could be determined by taking the RV in the $K^{th}$ position of that RV sequence, where K=(SFN modulo 4)+1. As one example, assume SFN=27, then K=(27 modulo 4)+1=3+1=4 and hence the RV to use for retransmission is the one in the $4^{th}$ position of the RV sequence, i.e. RV=1. Variations of this may also be envisioned whereby e.g. an offset and/or scaling of the above expression relating to e.g. the anticipated response-time of the network, etc., may be used to select an RV for a retransmission.

Figure 9:
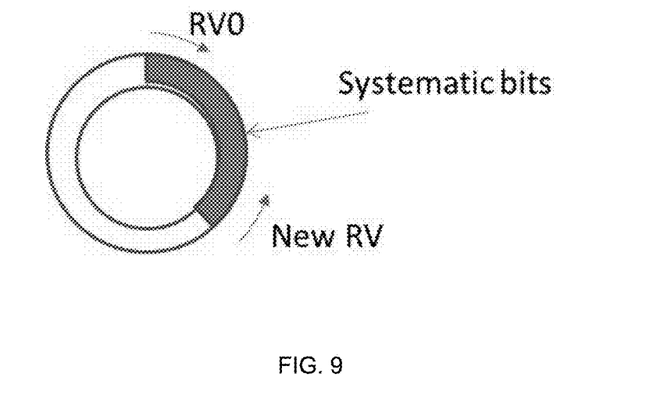
FIG. 9 is an example of RV value selection.

In some alternative embodiments, a new set of RVs is defined. For example, a goal may be to transmit systematic bits all the time, while at the same time, for the retransmission, have a new set of parity bits, to keep some of the benefits of incremental redundancy. An example is given in FIG. 9, where the original RV=0 (RV0), is shown. An example of a new RV is further shown, starting from the end of the systematic bits, and thus includes a different set of parity bits. In some embodiments, the RV sequence may be predefined, e.g. dependent on frame numbers.

In other embodiments, the restriction of increasing the RV may be dependent on whether the UE is configured to skip padding transmissions in the grant, or configured to skip padding transmissions for the grant conditionally if no data is available for transmission in the UL buffer. Furthermore, the restriction of increasing the RV for a retransmission may be dependent on whether a padding transmission was done in the original transmission (zero MAC SDUs), i.e. is dependent on the content of the MAC PDU.

In some alternative embodiments, ACK/NACK bits can be reassigned to solve RV mismatch problem such that a subset of bits allocated to ACK/NACK feedback may indicate the RV so as to avoid a potential RV mismatch problem proactively. For instance, while the legacy PHICH bits indicate either ACK (=111) or NACK (=000), in this case the first two bits may indicate ACK/NACK (=11X/00X) and the last bit may indicate the RV to avoid RV mismatch problem. This could be a viable solution especially when the coverage is sufficient i.e., feedback mechanism is sufficiently robust. Another way could be allocating multiple PHICH resources to a single UE and convey more info this way without any potential impairment in the feedback robustness. E.g., ACK+ACK→ACK+RV1, whereas ACK+NACK→ACK+RV2.

In scenario 2) described previously, the eNb sends ACK/NACK when UL data is detected. In some embodiments the UE is further configured to detect DTX on PHICH for "Fast UL Grants". Based on detection thresholds on PHICH, discussed below, the UE interprets the feedback as ACK, NACK, or DTX. In case an ACK is received by the UE, no non-adaptive retransmission is done. In some embodiments, when the UE detects DTX, a retransmission may be done with the same RV, i.e. DTX indicates to the UE that the eNB did not detect a transmission for that configured grant. If NACK is detected by the UE, this may represent that the eNb is aware of the transmission, therefore, on retransmission, the UE may use another RV since the eNB may also expect another RV on retransmission.

In an alternative embodiment, if DTX is detected, the UE may not non-adaptively retransmit the data, but instead, the UE may trigger a new transmission on the Fast UL grant containing the same data. In some embodiments, the UE may potentially update control information for the transmission. In other embodiments, the UE may select to use a fast UL grant valid earlier than when a non-adaptive retransmission would have taken place. In some embodiments, a higher power may be used for the next "fast UL grant" transmission compared to the current transmission. The power ramping step may be configured by the network or be fixed in the standard.

In some embodiments, the UE may not use the fast UL grant for the next transmission attempt if DTX is detected, but instead request access by sending a scheduling request, either on a dedicated scheduling request channel or by performing a random access procedure. In other embodiments, the fast UL grant may be considered permanently or temporarily revoked, where the grant may be valid again based on a timer or a signaling message from the network.

In some embodiments, the UE may indicate to the network if DTX is detected when using fast UL grants. This information may be signaled in a control element, e.g. a MAC control element or RRC message, in a following uplink transmission. In some embodiments, aggregated statistics of DTX detection is signaled, whereas in other embodiments explicit signaling is given for each DTX. In some embodiments the eNB uses this feedback to control the power level of PHICH, increasing the power if the ratio of DTX is higher than some threshold.

In some embodiments, the restriction from increasing the RV is dependent on the combination of DTX detection and skip padding configuration condition or condition whether padding MAC PDU had been sent.

Detection Levels for DTX.

In some embodiments, there may be error probabilities/detection thresholds configured by the network, and in other embodiments they are set by requirements in the standard. In an embodiment, the eNB signals an assumed power level of PHICH to the UE. In another embodiment, the UE instead derives the power level from some other parameters, e.g. based on the aggregation level used for signaling the fast UL grant, where a lower power is assumed for small aggregation levels compared to higher aggregation levels. In other embodiments, other signaling that gives an indication of downlink quality, such as CQI or downlink received power, such as RSRP, can be used to derive a power level. In certain embodiments, the power level is set dependent on the type of grant, e.g. the eNB may choose different (more robust) power levels for PHICH given a Fast UL grant as compared to a standard dynamic grant.

In some embodiments the eNB configures a minimum power level of PHICH, but may dynamically decide to use higher power levels for the specific user, e.g. based on expected channel quality of the user or load in the eNB. The minimum power level is then set to enable sufficient DTX detection while a higher power dynamically can be used to provide additional robustness to ACK/NACK to DTX errors.

In some embodiments, the threshold power levels may be determined by the impact of an erroneous decision. Typically, it is important to correctly detect DTX, since interpreting it as a false ACK may lead to a long higher-layer retransmission procedure. On the other hand, interpreting an ACK/NACK as a DTX would only trigger a quick retransmission with the same RV.

Figure 4:
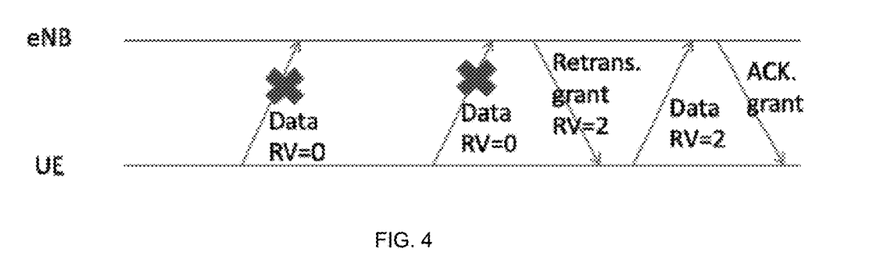
FIG. 4 illustrates an adaptive retransmission according to certain embodiments of the disclosure.

In scenario 2) described previously, the eNB does not transmit any HARQ feedback unless it has detected an UL transmission. According to FIG. 4, if a UE has performed a transmission and does not receive any feedback, it will then assume the packet was lost and retransmit with RV=0. However, if eNB subsequently detects the transmission, but still fails to decode the transmission correctly, the eNB may send a retransmission grant with a specified RV. The UE may then use the RV value specified in the retransmission grant in an adaptive retransmission. Because the eNB and the UE are both aware of the new RV value, an RV mismatch is avoided. If the eNB instead decodes the packet correctly it should indicate so to the UE by sending an acknowledgement grant.

If the UE has indicated that it has more data with the Buffer Status Report (BSR) in the UL data transmission, the eNB may respond with an acknowledgement grant in the form of a standard dynamic grant. If instead the UE has indicated that it has no more data (BSR=0), the eNB may send a different grant, which is not a retransmission grant. This grant may be in the form of DCI type 0 with a bit indicator flag set, or a new DCI format. The acknowledgement grant may be signaled using a specific combination of bits and the RNTI used to carry the grant and/or the search space in which it is transmitted.

In some embodiments, a single message can be used by the eNB to acknowledge multiple HARQ processes. This can be done by explicitly or implicitly encoding the processes or subframes where fast UL transmissions have been received from the user. In some embodiments, the UE may be configured with a timer stating by which time it is expected to receive an acknowledgment for a fast UL transmission. If no acknowledgement is received within this time the UE assumes the transmission to be lost. The UE may in some embodiments start a new fast UL transmission if the timer expires without receiving an acknowledgement. In certain embodiments the UE may send a scheduling request using D-SR or RA-SR.

In some embodiments, the eNB sets a timer based on the priority or expected data of a user. A longer timer is set for a user expected to be able to handle longer latencies, while setting shorter timers for more time critical users. In some embodiments, the timer may be set shorter than the time when a corresponding PHICH resource is available. In an embodiment, the eNB may not use soft combining but may have a shorter round trip time (RTT) than with normal HARQ.

Figure 5:
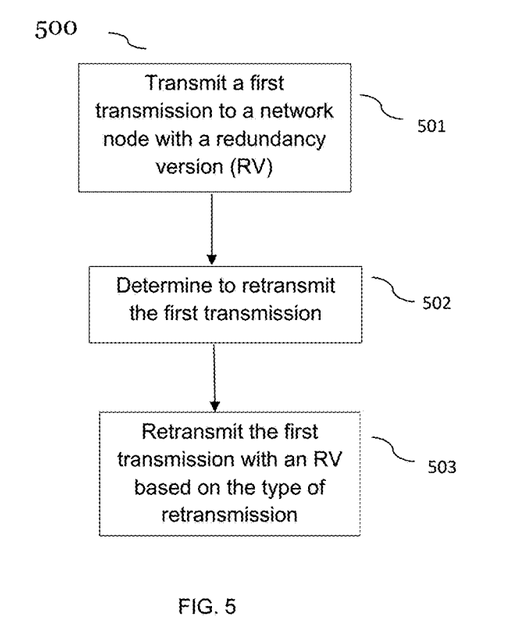
FIG. 5 illustrates a flowchart for performing a retransmission according to certain embodiments of the disclosure.

FIG. 5 is a flowchart for illustrating a method 500 for retransmission by a wireless device with Fast UL configured grants. In step 501, a wireless device (e.g. a UE) is configured to transmit a first transmission to a network node (e.g. eNB) with a redundancy version (RV). In step 502, the wireless device is further configured to determine to retransmit a first transmission, that is, the wireless device decides that it need to retransmit the first transmission. In step 503, the wireless device retransmits the first transmission with an RV based on the type of retransmission.

Figure 6:
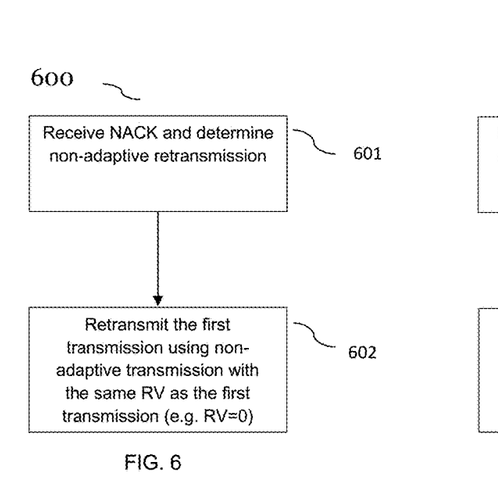
FIGS. 6-7 illustrate flowcharts related to performing a non-adaptive retransmission according to certain embodiments of the disclosure.

FIG. 6 is a further embodiment of the method 600 in which the wireless device, at 601, is configured to determine that the wireless device has received a NACK from the network node and to perform a non-adaptive retransmission. Then at 602, the wireless device is configured to retransmit the first transmission using non-adaptive retransmission with the same RV value as the first transmission, that is, the RV value is not changed from the first transmission when performing the subsequent non-adaptive retransmission. In an embodiment, the same RV is used for retransmissions until the wireless device detects that the retransmission was successfully received, e.g. decoded, by the network node. In an embodiment, RV=0 for the retransmission.

Figure 7:
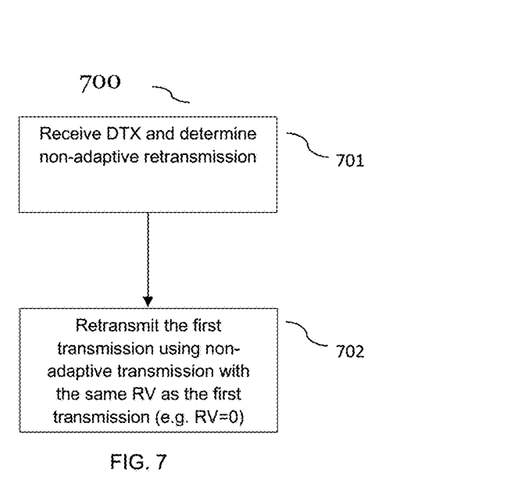

FIG. 7 is another embodiment of the method 700 in which the wireless device, at 701, is configured to determine that the wireless device has received a DTX indication from the network node and to perform a non-adaptive retransmission. Then at 702, the wireless device is further configured to retransmit the first transmission using non-adaptive transmission with the same RV as the first transmission, that is, the RV value is not changed from the first transmission when performing the subsequent non-adaptive retransmission. In an embodiment, the same RV is used for retransmissions until the wireless device detects that the retransmission was successfully received, e.g. decoded, by the network node. In an embodiment, RV=0 for the retransmission.

Figure 8:
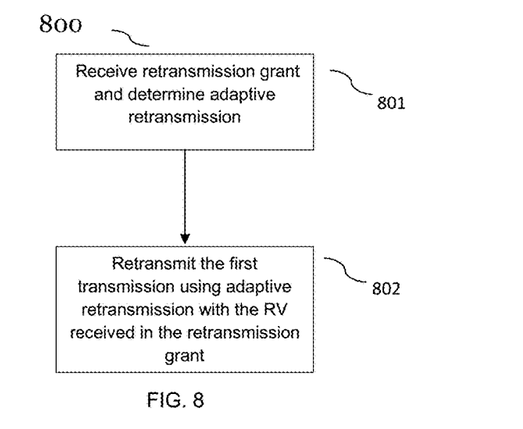
FIG. 8 is a flowchart related to performing an adaptive transmission according to certain embodiments of the disclosure.

FIG. 8 is a further embodiment of the method Boo in which the wireless device, at 801, is configured to determine that the wireless device has received a retransmission grant from the network node and to perform an adaptive retransmission. At 802, the wireless device is further configured to retransmit the first transmission using adaptive retransmission with the RV value indicated in the retransmission grant. In this embodiment, the RV value in the retransmission grant may be the same RV value as the first transmission or may be a different RV value.

Figure 10:
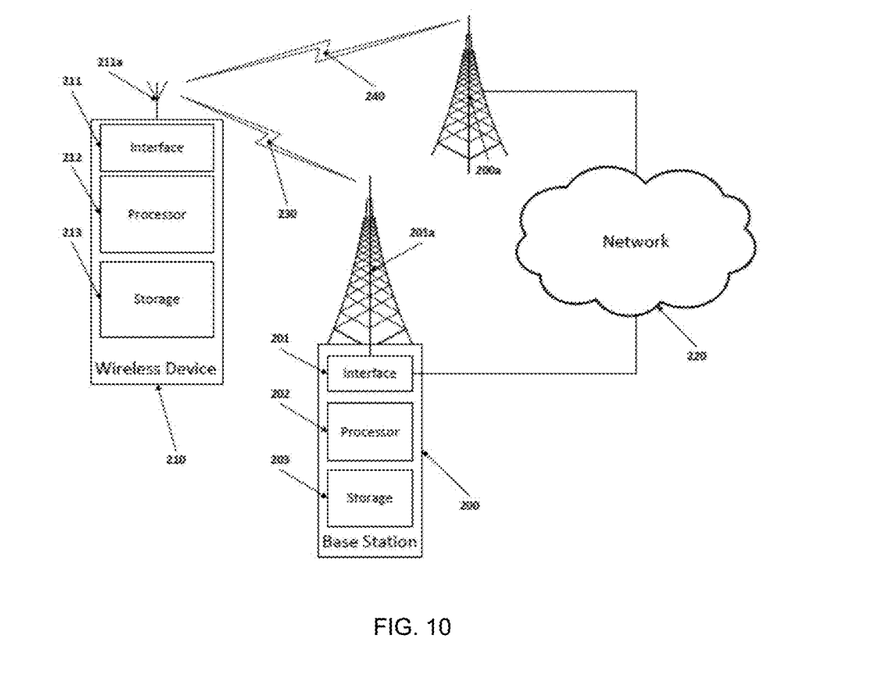
FIG. 10 is a depiction of a communications network.

FIG. 10 illustrates a wireless network comprising a more detailed view of network node 200, and wireless device (WD) 210, in accordance with a particular embodiment. For simplicity, FIG. 12 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, to be executed by the processor 202 so as to implement the above-described functionalities of the network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, to be executed by the processor(s) 212 so as to implement the above-described functionalities of the WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200. In some embodiments, the WD, may transmit transmissions and retransmissions to the network node, and receive feedback from the network node.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 11:
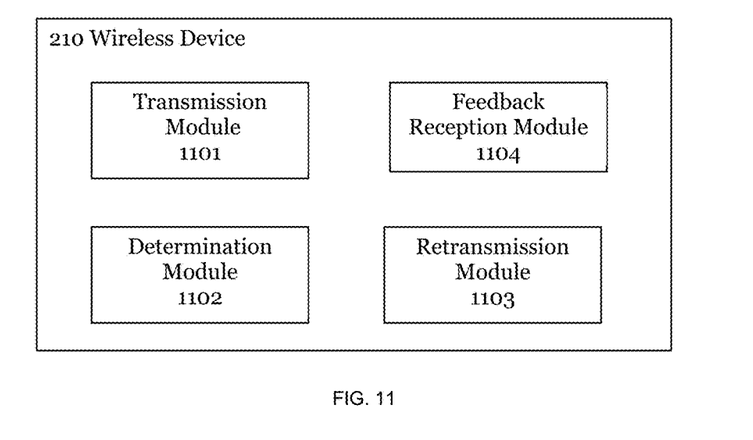
FIG. 11 is an illustration of an embodiment of a wireless device.
Figure 12:
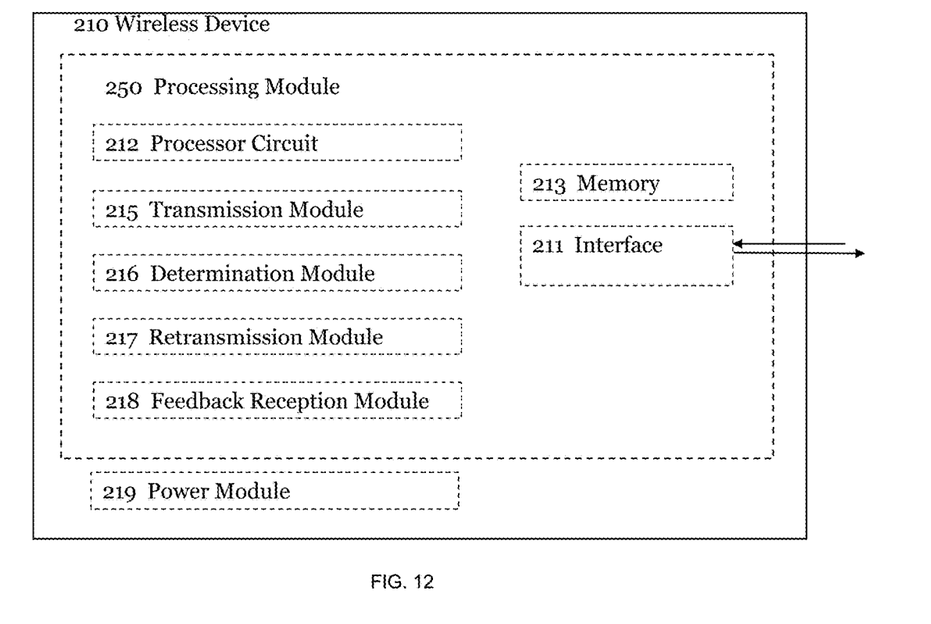
FIG. 12 is an illustration of an alternative embodiment of a wireless device.
Figure 13:
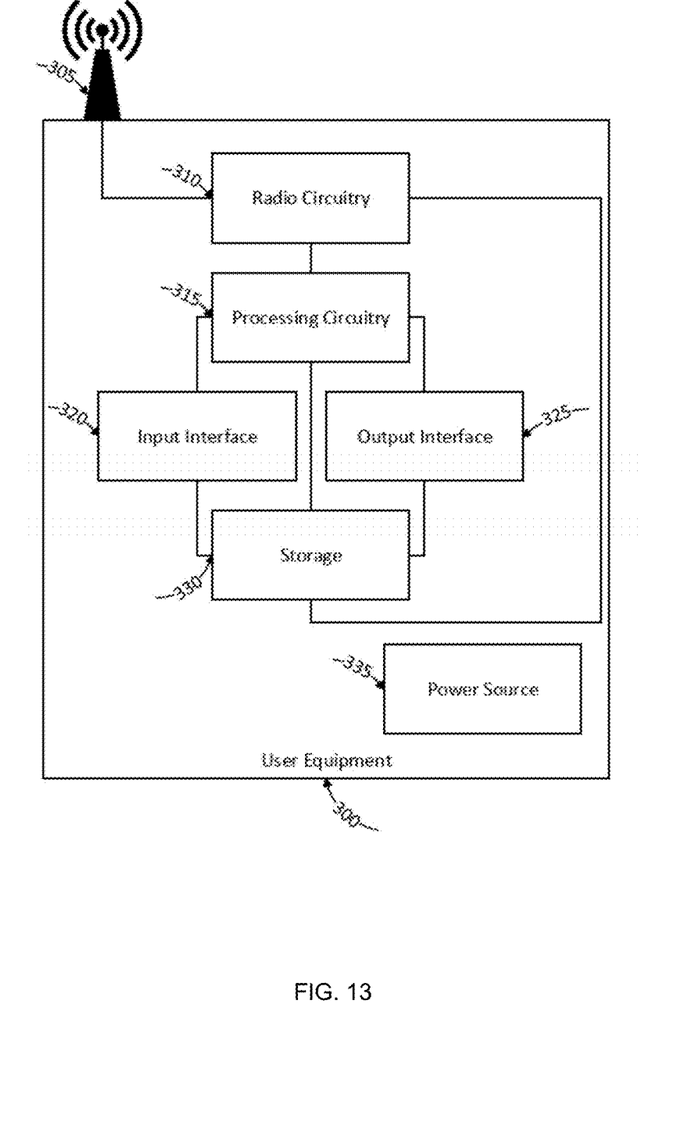
FIG. 13 is an illustration of an embodiment of a user equipment.

FIG. 11 depicts an embodiment of a WD 210, but which embodiment may also be applicable to UE 300 (described in FIG. 13). WD 210, comprises a transmission module 215 for transmitting a first transmission to a network node with a redundancy version (RV), a determination module 216 for retransmitting the first transmission, and a retransmission module 217 configured to retransmit the first transmission with a retransmission RV based on the type of transmission. The WD 210 further comprises a feedback reception module 218 to receive feedback, including an acknowledgement grant from the network node. The transmission module 215, determination module 216, retransmission module 217, and feedback reception module 218 are further configured to perform the steps corresponding to the method of FIGS. 5-8. FIG. 12 further depicts an embodiment of WD 210 comprising a processing module 250 that includes a processing circuit 212, a memory 213, and an interface 211 for I/O from WD 210. Processing module 250 further includes the various program code modules or units, e.g. the transmission module 215, determination module 216, retransmission module 217, and feedback reception module 218, which are executed by processing module 250 causing the apparatus to perform the steps corresponding to the method steps of FIGS. 5-8. UE 300 may also implement a similar arrangement of the modules in its corresponding components, which are described below.

As shown in FIG. 13, user equipment 300 is an example wireless device. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 3 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, WiFi, or Bluetooth wireless technologies. These wireless technologies may be integrated into the same or different chipsets and other components within wireless device 300.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the figure above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein. The functional modules may be similarly implemented by the components of UE 300, described herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for retransmission of uplink transmissions, by a wireless device with configured uplink grants, the method comprising:
    transmitting a first transmission to a network node with a redundancy version (RV);
    receiving a message from the network node;
    determining whether an adaptive retransmission is to be made, or whether a non-adaptive retransmission is to be made;

upon determining that an adaptive retransmission is to be made:
: setting the redundancy version to correspond to a specified redundancy version value specified in the message; and
: retransmitting the first transmission using the specified redundancy version value;

upon determining that a non-adaptive retransmission is to be made:
: setting the redundancy value to zero; and
: retransmitting the first transmission using a zero redundancy version value.

2. The method of claim 1, wherein the retransmission is non-adaptive, and wherein the retransmission RV is the same as the RV of the first transmission.

3. The method of claim 2, wherein determining to retransmit the first transmission comprises receiving a negative acknowledgment (NACK) from the network node in response to the first transmission.

4. The method of claim 2, wherein determining to retransmit the first transmission comprises detecting discontinuous transmission (DTX) from the network node in response to the first transmission.

5. The method of claim 2, further comprising, retransmitting with the same RV of the first transmission until detecting that the retransmission was successfully decoded by the network node.

6. The method of claim 1, wherein determining to retransmit the first transmission comprises receiving an acknowledgment grant with an RV value specified by the network node, and wherein the retransmission is adaptive.

7. A wireless device for performing retransmission of uplink transmissions based on configured grants, the wireless device comprising:
: power supply circuitry configured to supply power to said wireless device; and
: processing circuitry configured to:
:: transmit a first transmission to a network node with a redundancy version (RV);
:: receive a message from the network node;
:: determine whether an adaptive retransmission is to be made, or whether a non-adaptive retransmission is to be made;
:: upon determining that an adaptive retransmission is to be made:
::: set the redundancy version to correspond to a specified redundancy version value specified in the message; and
::: retransmit the first transmission using the specified redundancy version value;
:: upon determining that a non-adaptive retransmission is to be made:
::: set the redundancy value to zero; and
::: retransmit the first transmission using a zero redundancy version value.

8. The wireless device of claim 7, wherein the retransmission is non-adaptive, and the retransmission RV is the same as the RV of the first transmission.

9. The wireless device of claim 8, wherein the wireless device determines to retransmit the first transmission when the wireless device receives a negative acknowledgment (NACK) from the network node in response to the first transmission.

10. The wireless device of claim 8, wherein the UE determines to retransmit the first transmission when the wireless device detects a discontinuous transmission (DTX) from the network node in response to the first transmission.

11. The wireless device of claim 8, wherein the wireless device retransmits with the same RV of the first transmission until detecting that the retransmission was successfully decoded by the network node.

12. The wireless device of claim 7, the wireless device determines to retransmit the first transmission when the wireless device receives an acknowledgment grant with a RV value specified by the network node, and wherein the retransmission is adaptive.

13. A user equipment, UE, for performing retransmission of uplink transmissions based on configured grants, said UE comprising:
: an antenna configured to send and receive wireless signals;
: radio front-end circuitry connected to the antenna and to processing circuitry, and configured to condition signals communicated between the antenna and the processing circuitry;
: the processing circuitry being configured to:
:: transmit a first transmission to a network node with a redundancy version (RV),
:: receive a message from the network node;
:: determine whether an adaptive retransmission is to be made, or whether a non-adaptive retransmission is to be made;
:: upon determining that an adaptive retransmission is to be made:
::: set the redundancy version to correspond to a specified redundancy version value specified in the message; and
::: retransmit the first transmission using the specified redundancy version value;
:: upon determining that a non-adaptive retransmission is to be made:
::: set the redundancy value to zero; and
::: retransmit the first transmission using a zero redundancy version value; and
: an input interface connected to the processing circuitry and configured to allow input of information into the UE to be processed by the processing circuitry;
: an output interface connected to the processing circuitry and configured to output information from the UE that has been processed by the processing circuitry; and
: a battery connected to the processing circuitry and configured to supply power to the UE.

14. A wireless device for performing retransmission of uplink transmissions based on configured grants, the wireless device comprising:
: processing circuitry configured to:
:: transmit a first transmission to a network node with a redundancy version (RV);
:: receive a message from the network node;
:: determine whether an adaptive retransmission is to be made, or whether a non-adaptive retransmission is to be made;
:: upon determining that an adaptive retransmission is to be made:
::: set the redundancy version to correspond to a specified redundancy version value specified in the message; and
::: retransmit the first transmission using the specified redundancy version value;
:: upon determining that a non-adaptive retransmission is to be made:
::: set the redundancy value to zero; and
::: retransmit the first transmission using a zero redundancy version value; and further comprising power supply circuitry configured to supply power to said wireless device.

* * * * *